United States Patent
Büchler et al.

(10) Patent No.: US 7,466,636 B2
(45) Date of Patent: Dec. 16, 2008

(54) METHOD FOR GENERATING A CORRECTED ERROR SIGNAL, AND CORRESPONDING APPARATUS

(75) Inventors: Christian Büchler, Villingen-Schwenningen (DE); Friedhelm Zucker, Villingen-Schwenningen (DE)

(73) Assignee: Thomson Licensing, Boulogne Billancourt (FR)

( * ) Notice: Subject to any disclaimer, the term of this patent is extended or adjusted under 35 U.S.C. 154(b) by 42 days.

(21) Appl. No.: 10/362,394

(22) PCT Filed: Aug. 14, 2001

(86) PCT No.: PCT/EP01/09360

§ 371 (c)(1),
(2), (4) Date: Feb. 24, 2003

(87) PCT Pub. No.: WO02/17311

PCT Pub. Date: Feb. 28, 2002

(65) Prior Publication Data

US 2004/0100841 A1    May 27, 2004

(30) Foreign Application Priority Data

Aug. 24, 2000 (DE) .............................. 100 41 569
Dec. 13, 2000 (DE) .............................. 100 62 080

(51) Int. Cl.
*G11B 7/09* (2006.01)
(52) U.S. Cl. ............... 369/44.32; 369/44.37; 369/44.41
(58) Field of Classification Search .............. 369/44.37, 369/44.28, 44.26, 44.41, 47.5, 53.1, 53.23, 369/53.22, 59.1, 124.02, 44.23, 44.14, 120, 369/112.12, 112.15, 112.04, 112.05, 112.08, 369/44.12, 112.24, 44.29, 44.36, 44.35, 44.38
See application file for complete search history.

(56) References Cited

U.S. PATENT DOCUMENTS 4,568,168 A * 2/1986 Sakai et al. .................. 396/126
5,155,717 A * 10/1992 Bakx ....................... 369/44.37

(Continued)

FOREIGN PATENT DOCUMENTS

EP         512616         11/1992

(Continued)

OTHER PUBLICATIONS

Patent Abstracts of Japan, vol. 2000, No. 10, Nov. 17, 2000 & JP 2000-187857.

*Primary Examiner*—Hoa T. Nguyen
*Assistant Examiner*—Kim Chu
(74) *Attorney, Agent, or Firm*—Joseph J. Laks; Harvey D. Fried; Patricia Verlangieri

(57) ABSTRACT

In order to obtain a corrected or compensated focus error signal or track error signal, it is proposed to generate primary and secondary scanning beams incident on adjacent tracks of an optical recording medium and to detect the primary and secondary scanning beams reflected from the optical recording medium in order to derive from them primary-beam and secondary-beam focus error signals or primary-beam and secondary-beam track error signals, which are subsequently normalized in order to obtain the compensated focus error signal or track error signal from the normalized primary-beam and secondary-beam error signals by means of weighted combinations. As a result of the normalization, the corrected or compensated focus error signal or track error signal is generated independently of the reflection properties of the respectively scanned track.

14 Claims, 12 Drawing Sheets

U.S. PATENT DOCUMENTS

Figure 1:
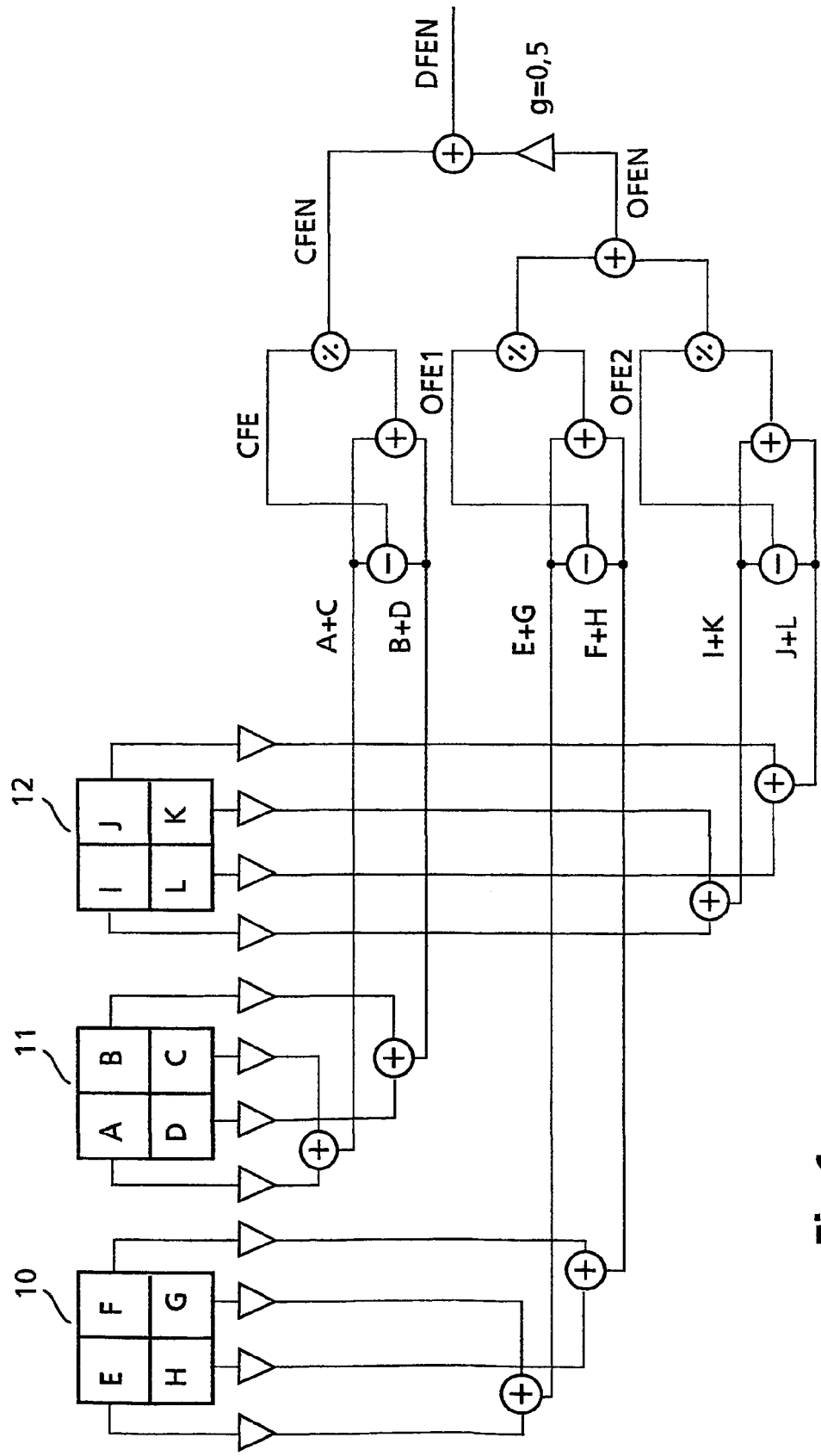

| | | | | |
|---|---|---|---|---|
| 5,185,729 A | * | 2/1993 | Noda et al. | 369/44.14 |
| 5,224,082 A | * | 6/1993 | Kurokawa et al. | 369/44.23 |
| 5,587,985 A | * | 12/1996 | Sano et al. | 369/124.02 |
| 5,642,341 A | * | 6/1997 | Stork | 369/44.41 |
| 5,671,199 A | * | 9/1997 | Nishikawa | 369/44.26 |
| 5,768,227 A | * | 6/1998 | Baba | 369/44.28 |
| 5,802,029 A | | 9/1998 | Zucker | 369/44.29 |
| 5,828,634 A | * | 10/1998 | Ohno et al. | 369/44.26 |
| 5,852,592 A | * | 12/1998 | Braat | 369/44.35 |
| 5,854,780 A | * | 12/1998 | Opheij et al. | 369/44.23 |
| 5,909,416 A | * | 6/1999 | Matsui | 369/44.41 |
| 6,229,771 B1 | * | 5/2001 | Kosoburd et al. | 369/44.23 |
| 6,388,963 B1 | * | 5/2002 | Tanaka | 369/44.26 |
| 6,438,077 B1 | * | 8/2002 | Mashimo | 369/44.28 |
| 6,567,355 B2 | * | 5/2003 | Izumi et al. | 369/44.41 |

FOREIGN PATENT DOCUMENTS

| | | |
|---|---|---|
| EP | 766234 | 4/1997 |
| EP | 829857 | 3/1998 |
| JP | 2000-187857 | 7/2000 |

* cited by examiner

METHOD FOR GENERATING A CORRECTED ERROR SIGNAL, AND CORRESPONDING APPARATUS

This application claims the benefit, under 35 U.S.C. § 365 of International Application PCT/EP01/09360, filed Aug. 14, 2001, which was published in accordance with PCT Article 21(2) on Feb. 28, 2002 in English and which claims the benefit of German patent application No. 10041569.5 filed Aug. 24, 2000 and German patent application No. 10062080.9 filed Dec. 13, 2000.

The present invention relates to a method for generating a corrected error signal, in particular an offset-compensated focus error signal or track error signal, for an apparatus for reading from and/or writing to an optical recording medium according to the preamble of claim 1, and also to a correspondingly configured apparatus according to the preamble of claim 16.

One of the widespread methods for forming a focus error signal is the so-called astigmatism method. This method can be used if only one type of track is intended to be scanned or there is minor interaction between the type of track region scanned and the focus error signal. Optical storage media in which information tracks are contained both in depressions, referred to as "groove", and in elevations, referred to as "land", have different focus offsets during the focus error signal generation according to the traditional astigmatism method during the scanning of information tracks in tracks with depressions and tracks with elevations. The asymmetries of the track geometry (width ratios, flank slope of the track edges, etc.) may be regarded as a reason for this.

The problems associated with the conventional method will be explained in more detail below.

The focus error signal is conventionally generated for example according to the DFE method ("Differential Focus Error"). When the DFE method is employed, the laser beam of an optical scanner comprises three beams, namely a primary beam and two secondary beams which scan adjacent tracks of the respective optical storage medium or optical recording medium. The primary and secondary beams reflected from the optical recording medium are evaluated in order to obtain, in a manner dependent thereon, primary-beam and secondary-beam focus error signals from which the desired focus error signal is generated by means of a weighted combination. In order to achieve the splitting into three beams, an optical grating is inserted into the beam path of the light source.

Figure 5:
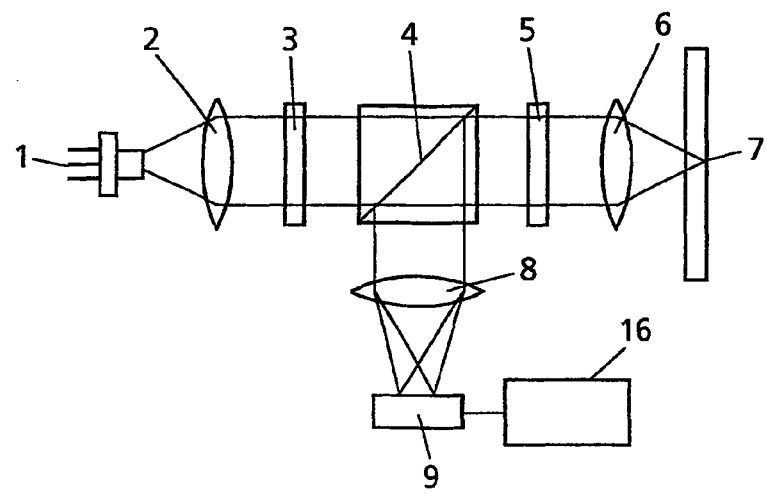

FIG. 5 illustrates a corresponding arrangement. The light emitted by a light source or a laser 1 passes through a collimator lens 2 and is then split into the primary beam (i.e. a 0 th-order beam) and the two secondary beams (i.e. ±1 st-order beams) by a diffraction grating 3. The primary beam, which reads the information to be scanned in a track of a corresponding optical recording medium 7, usually contains the majority (approximately 80-90%) of the light information. The two secondary beams each contain the remaining approximately 5-10% of the total light intensity, it being assumed for the sake of simplicity that the light energy of the higher orders of diffraction of the grating 3 are zero. These three beams are focussed onto the optical recording medium 7 via a polarizing beam splitter 4 and a quarter-wave plate 5 and also an objective lens 6, in order to read from and/or write to the said optical recording medium. The three beams reflected from the optical recording medium 7 are fed via the beam splitter 4 and a cylindrical lens 8 to a photodetector unit 9, which detects the three beams reflected from the optical recording medium 7. Connected to the photodetector unit 9 is an evaluation circuit 16 which evaluates the detected reflected primary and secondary beams for the purpose of generating a focus error signal. Primary and secondary beams are spatially separate from one another only in the focussed or virtually focussed state, so that they are illustrated as a common beam pencil in the figure.

Figure 6:
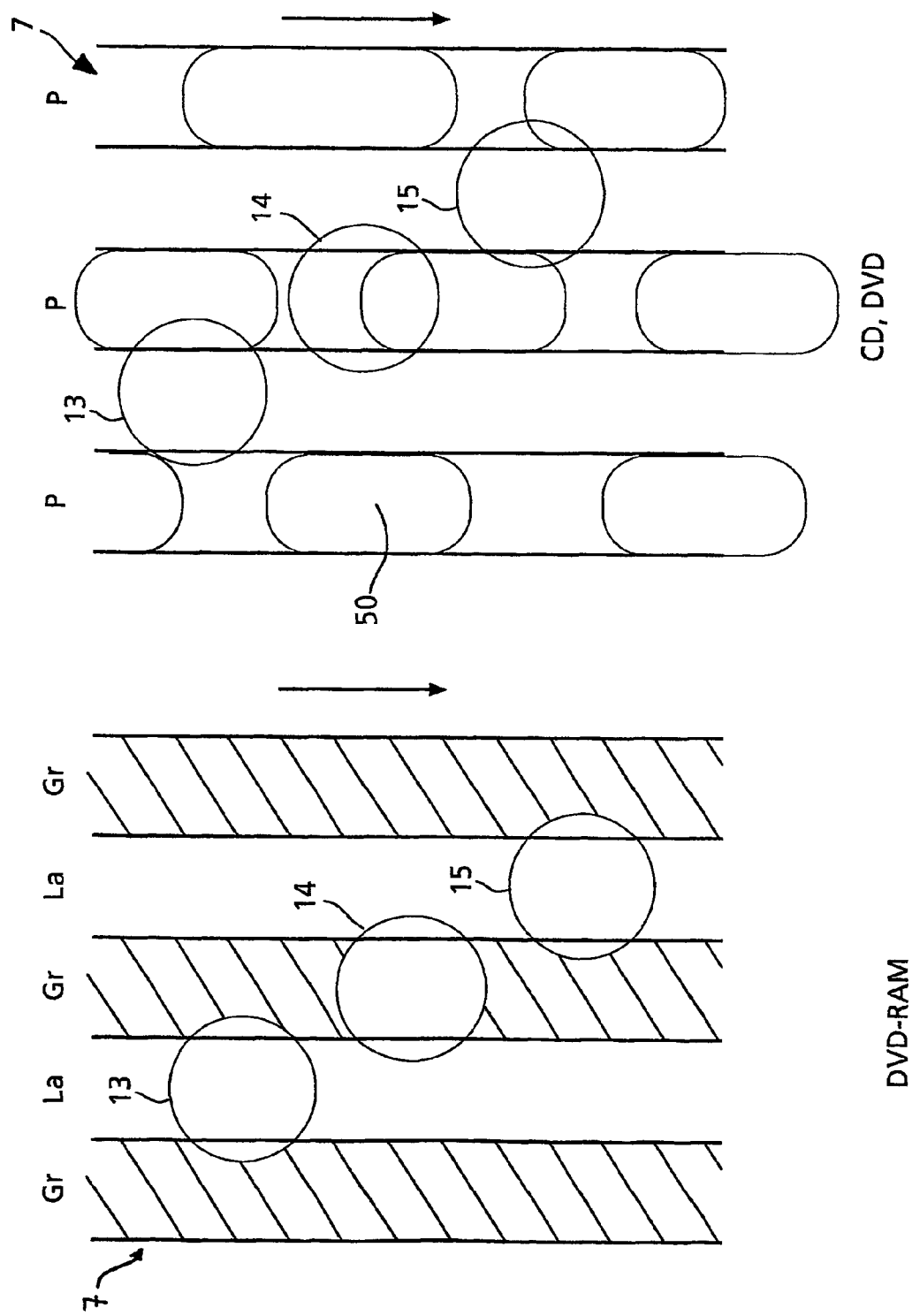

As is illustrated in FIG. 6 using a DVD-RAM as optical recording medium 7, the optical grating 3 is constructed in such a way that the imaging of the two secondary beams 13 and 15 scans precisely the centre of the secondary tracks or (in the case of media which can be written to only in "groove" tracks) the centre beside the track scanned by the primary beam 14. FIG. 6 also illustrates an example of the scanning of optical recording media, for example a CD-ROM or DVD-ROM, having so-called "pits" 50, the direction of rotation of the optical recording medium being indicated in each case by the arrow in FIG. 6. Only a very small detail from the information-carrying layer of the recording medium 7 is illustrated in each case in a diagrammatic illustration. The tracks designed as depressions are designated by "groove" or Gr and simply shown hatched, while the tracks designed as elevations are designated by "land" or La and are not hatched. In the right-hand part of FIG. 6, the tracks provided with information are provided with diagrammatically illustrated pits, i.e. depressions or markings which influence a beam property in some other way.

Since the secondary beams 13 and 15 and the primary beam 14 are intended to be optically separable from one another, the positions of their imaging on the optical recording medium 7 and on the photodetector unit 9 are separate from one another. If the optical recording medium 7 rotates, then one of the secondary beams is situated in front of, and the other secondary beam behind, the primary beam in the reading or writing direction.

Considered by themselves in each case, both the primary beam and the secondary beams generate, on the correspondingly chosen photodetector unit 9 and after subsequent suitable combination of the detector signals, a primary-beam and, respectively, secondary-beam focus error signal which represents the focus error of the respective beam with respect to the scanned surface of the optical recording medium 7. However, since the two secondary beams scan the two secondary tracks with respect to the actual read/write track (and hence the inverted position "groove"/"land"), the focus offset error of the secondary beams is inverted relative to the focus offset error of the primary beam. Consequently, considered by themselves, the respective focus error signals in each case contain the actual focus error with respect to the illuminated surface and also oppositely oriented track-position-dependent focus offset components.

In order to illustrate these facts, FIGS. 8A and 8B illustrate the detection of the primary and secondary beams reflected from the optical recording medium 7 using the example of a photodetector unit 9, having three multi-zone photodetectors 10-12, the two photodetectors 10 and 12 each being provided for detection of a secondary beam, while the photodetector 11 serves for detection of the reflected primary beams. Each photodetector 10-12 has four photodetector elements, designated by E-G, A-D and I-L, respectively. This designation will also be used hereinafter for referring to the output signals generated by the corresponding photodetector elements. FIG. 8A illustrates the example of a photodetector image given the presence of a track-position-dependent focus offset component without focus error, while FIG. 8B illustrates the example of a photodetector image with focus error but without track-position-dependent offset.

If the focus error signals of the secondary beams are then added and this sum is in turn added to the focus error signal of the primary beam, these undesirable focus offset components cancel one another out given appropriate weighting between the primary and secondary beam components. Since the focus error components of primary and secondary beams are synchronous relative to one another, these are added in the correct phase.

Consequently, given correct setting of the weighting factor, all that remains is the actual focus error without a track-position-dependent focus offset component.

In this case, however, it must be taken into account that the amplitude of the focus error contribution of each scanning beam is proportional to the average reflection of the respectively scanned track of the optical recording medium. Therefore, the functioning of the previously described procedure presupposes that the intensity ratios between the primary beam and the secondary beams do not change relative to one another, in order to be able to set a specific weighting factor for compensation purposes. Herein lies the problem of the previously described method, however. If an optical recording medium that has been written to completely is read, then the reflection properties of the "groove" and "land" tracks (for example in a DVD-RAM) are identical. It can then be assumed, in a simplification, that the undesirable track-position-dependent offset components and also the desired focus error components of the three scanning beams each have the same magnitude. Presupposing this, it is possible to find a weighting factor which provides for complete compensation of the track-position-dependent focus offset components.

Figure 7:
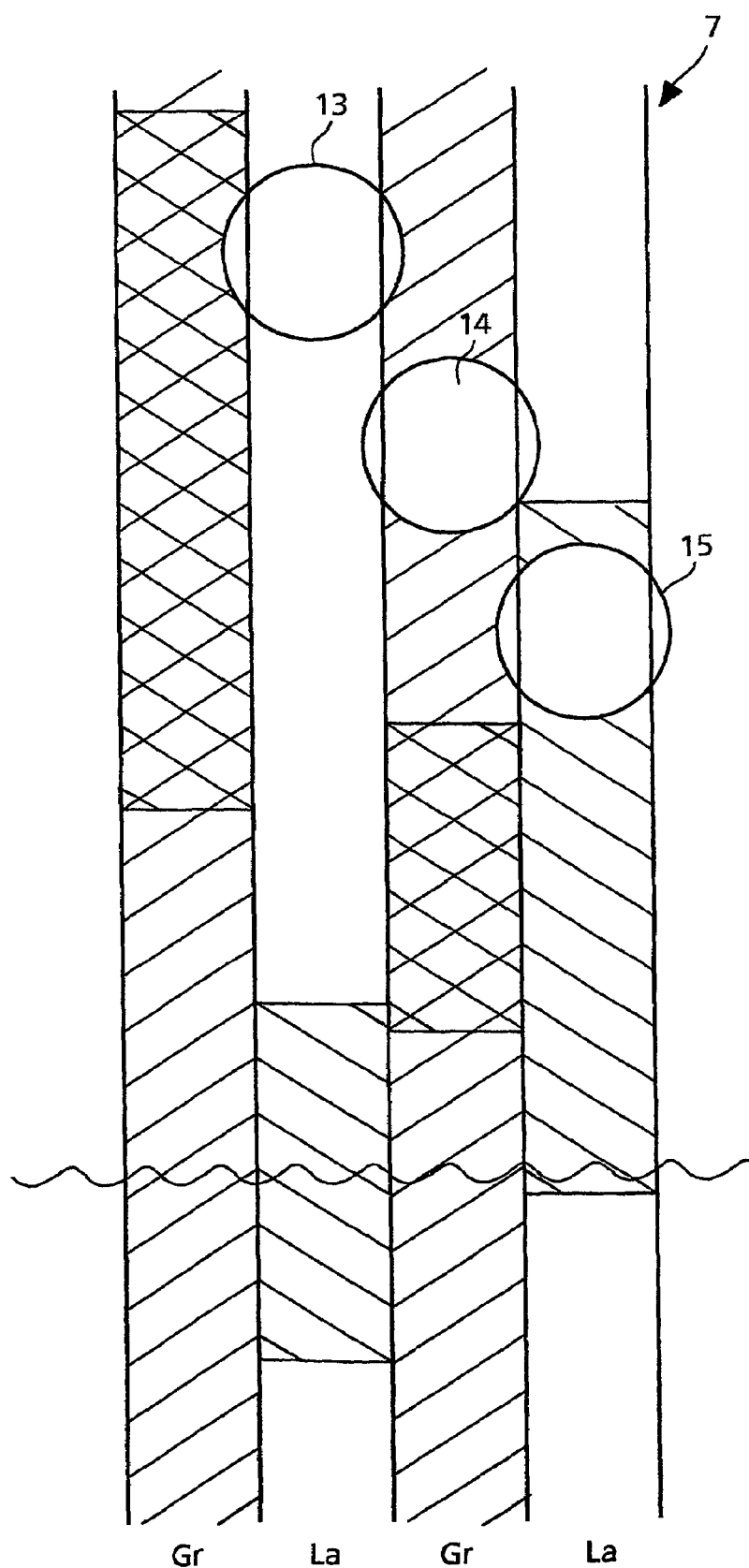

If, however, as is shown in FIG. 7, a hitherto blank optical recording medium, or one which has been recorded on only in part, is written to, then the primary beam used for writing alters the reflection properties of the storage medium on the tracks currently written to. If a "groove" track is written to in a DVD-RAM disc, for example, then only the reflection property of this track changes in the course of writing. The reflection properties of the "land" secondary tracks remain unaltered. This means that the weighting factor used hitherto no longer leads to compensation of the track-position-dependent focus offset components. The weighting factor is likewise no longer valid for a case in which the primary beam scans a written-to track and one of the two secondary tracks has been written to but the other has not. Since the sectors of a DVD-RAM disc do not have to be written to continuously, problems can thus already arise during the scanning of such a disc if the reflection properties of the track read and the secondary tracks differ from one another. In order to illustrate this problem, FIG. 7 illustrates the unwritten parts of the "groove" or "land" tracks, which have different reflection properties from the written parts, hatched from top left to bottom right. The groove tracks, which are identified by hatching anyway, are thus doubly hatched in the written region, while the land tracks are not hatched in the unwritten region.

These problems can likewise occur in storage media on which information is stored only in "groove" tracks. When a storage medium of this type is written to, the reflection of the written track likewise changes. Since only "groove" tracks are written to, in theory the reflection properties of the regions between the tracks do not change as a result of the "groove" track being written to. In practice, however, owing to the small track spacings on the storage medium, there are also influences of the writing primary beam on the reflection of the regions directly beside the primary track. This means that the beam leading to the primary beam and the beam following the primary beam scan regions between the tracks which have different reflection properties.

Thus, in the case of the two types of optical recording media described above, it is not possible to set a generally valid weighting factor which enables complete compensation of the track-position-dependent focus offset component. Although in theory it is possible to determine and store different settings for the weighting factor on the basis of the different properties of the respectively scanned track regions, it would then be necessary, with corresponding complexity, at all times to determine the state of the instantaneously scanned region and to set the appropriate weighting factor. However, in particular in the case of track jumps and imperfections of the storage medium to be read from or written to, this can lead to insoluble problems since the currently scanned region of the storage medium then cannot be reliably ascertained.

A similar problem occurs when generating a track error signal.

The track error signal is conventionally generated for example according to the so-called DPP method ("Differential Push-Pull"), as is described for example in the publication "Land/Groove Signal and Differential Push-Pull Signal Detection for Optical Disks by an Improved 3-Beam Method", Ryuichi Katayama et al., Japanese Journal of Applied Physics, vol 38 (1999), pages 1761-1767. When the DPP tracking method is employed, too, the original laser beam is split into three beams, namely a primary beam and two secondary beams which scan adjacent tracks of the optical recording medium respectively used. As shown in FIG. 5, the primary and secondary beams reflected from the optical recording medium are detected by a photodetector unit 9 and evaluated by an evaluation circuit 16 in order to obtain the track error signal. In the process, considered by themselves in each case, both the primary beam and the secondary beams generate a push-pull signal which represents the track error of the respective signal with regard to the respectively scanned track. However, since the two secondary beams scan the secondary tracks with respect to the read/write track, their push-pull error is inverted with respect to that of the primary beam. Considered by themselves, the respective push-pull components thus contain the actual track error with respect to the respectively scanned track. Since the track position of the three beams can only change together, the three push-pull signals change equally.

If the objective lens 6 is then moved in the track direction, the imaging of primary and secondary beams on the photodetector unit 9 also moves. This displacement of the imaging results in an offset voltage at the output of the photodetector unit 9. The direction of this offset voltage is identical for all of the beams. The displacement of the objective lens 6 thus gives rise to an offset voltage which does not originate from an actual track error and is therefore an interference. The genuine track error component and the undesirable lens-movement-dependent component are added in the push-pull signal yielded by the respective detectors of the photodetector unit 9.

For illustration purposes, FIG. 10A illustrates a photodetector image with push-pull, while FIG. 10B illustrates a photodetector image with spot movement. In both illustrations, it is assumed that the photodetector unit 9 has three photodetectors 10-12, the photodetector 11 detecting the primary beam reflected from the optical recording medium 7, while the other two photodetectors 10 and 12 detect the reflected secondary beams. Furthermore, it is assumed that the photodetector is a four-quadrant detector (also cf. FIG. 8), while the two photodetectors 10 and 12, which serve for detection of the reflected secondary beams, merely have two photodetector elements E1 and E2, and, respectively, F1 and F2.

If the signals yielded by the photodetectors 10 and 12 are then added and this summation signal is subtracted from the signal of the photodetector 11 which detects the reflected primary beam, then the previously described lens-movement-dependent component is cancelled out given appropriate weighting between the primary and secondary beam components. However, since the push-pull components of primary and secondary beams are inverted with respect to one another, they are added in the correct phase after application of the subtraction. Consequently, given correct setting of the weighting factor, all that remains is the actual track error.

The previously described procedure for determining a corrected or compensated track error signal is thus similar to the abovementioned procedure for determining a compensated or corrected focus error signal. In the case of determining the corrected track error signal, too, however, the functioning of this method presupposes that the intensity ratios between primary beams and secondary beams do not change relative to one another.

If an optical storage medium that has been written to completely is read, then the reflection properties of the "groove" tracks or "land" tracks are identical in the case of a DVD-RAM recording medium. Consequently, it is possible to find a weighting factor which provides for complete compensation of the lens-movement-dependent components.

If, however, a hitherto blank optical medium is written to, then the primary beam used for writing alters the reflection properties of the optical storage medium on the tracks currently written to. If a "groove" track is written to on a DVD-RAM disc, for example, then only the reflection property of this track changes in the course of writing. The reflection properties of the "land" secondary tracks remain unaltered. This means that the weighting factor used hitherto no longer leads to the compensation of the lens-movement-dependent component. The weighting factor is likewise no longer valid if the primary beam scans a track that has already been written to, and one of the two secondary tracks has been written to, while the other has still not been written to. Since the sectors of a DVD-RAM disc, for example, do not have to be written to continuously, problems can thus already arise during the scanning of such a disc if the reflection properties of the track read and of the secondary tracks differ from one another.

These problems can likewise occur in the case of storage media in which information is stored only in "groove" tracks. When a storage medium of this type is written to, the reflection property of the written-to track likewise changes. Since only "groove" tracks are written to, in theory the reflection properties of the regions between the tracks do not change as a result of the "groove" track being written to. In practice, owing to the small track spacings on the optical recording medium, there are also influences of the writing primary beam on the reflection of the regions situated directly beside the primary track. This means that the secondary beam leading the primary beam and the secondary beam following the primary beam read different reflection properties of the regions between the individual tracks.

Consequently, in the case of the two types of optical recording media described previously, it is not possible to set a generally valid weighting factor which achieves complete compensation of the lens-movement-dependent component.

EP 0 788 098 A1 proposes generating a track error signal or a focus error signal from the output signals of a photodetector having multi-zone detector elements, the track error signal or focus error signal, after being generated, being divided by a summation signal composed, inter alia, of all the output signals of the individual photodetector elements. In this way, normalization of the focus error signal or track error signal is carried out after the generation thereof.

The present invention is based on the object of proposing a method for generating a corrected error signal for the operation of an apparatus for reading from and/or writing to an optical recording medium, and also a correspondingly configured apparatus, the compensated or corrected error signal being obtained independently of the type and reflection property of the respectively scanned track of the optical recording medium.

This object is achieved according to the invention by means of a method having the features of claim 1 and an apparatus having the features of claim 16. The subclaims each define preferred and advantageous embodiments of the present invention.

According to the invention it is proposed, for the purpose of generating the respective error signal, which may be, in particular, a focus error signal or a track error signal, to generate primary and secondary scanning beams which scan adjacent tracks of the optical recording medium respectively used. From the reflected primary and secondary scanning beams, primary-beam and secondary-beam error signals are respectively derived and normalized, the corrected or compensated error signal being obtained from the normalized primary-beam and secondary-beam error signals by means of weighted combination.

The error signals may be, in particular, focus error signals obtained according to the DFE method, or track error signals obtained according to the DPP method.

According to one variant of the invention, the primary-beam and secondary-beam error signals are normalized separately in each case. In accordance with another variant, joint normalization is provided for the secondary-beam error signals. For both cases, according to the invention, exemplary embodiments are proposed which, by means of a corresponding choice of weighting factor, enable complete compensation of the track-position-dependent focus offset components (when generating the focus error signal) or of the lens-movement-dependent track offset component (when generating the track error signal) even in the event of varying reflection conditions of the respectively scanned tracks. In this way, stable and offset-free focus or track regulation is possible independently of the reflection conditions of the respectively scanned optical recording medium, the normalization proposed according to the invention also obviating the need to determine the weighting factor continuously using a suitable method.

Consequently, the present invention is a refinement of the so-called DFE or DPP methods for forming an offset-compensated focus error signal or track error signal, respectively, with the present invention also being able to be applied in particular to optical recording media whose information tracks have been recorded on in part and are blank in part. In particular, the present invention can also be applied to optical recording media whose information is stored both in depressions, i.e. in "groove" tracks, and in elevations, i.e. in "land" tracks, such as DVD-RAM discs for example.

The present invention is explained in more detail below using preferred exemplary embodiments with reference to the accompanying drawing. In this case, it is understood that modifications within the scope of expert ability likewise lie within the scope of the present invention.

Figure 2:
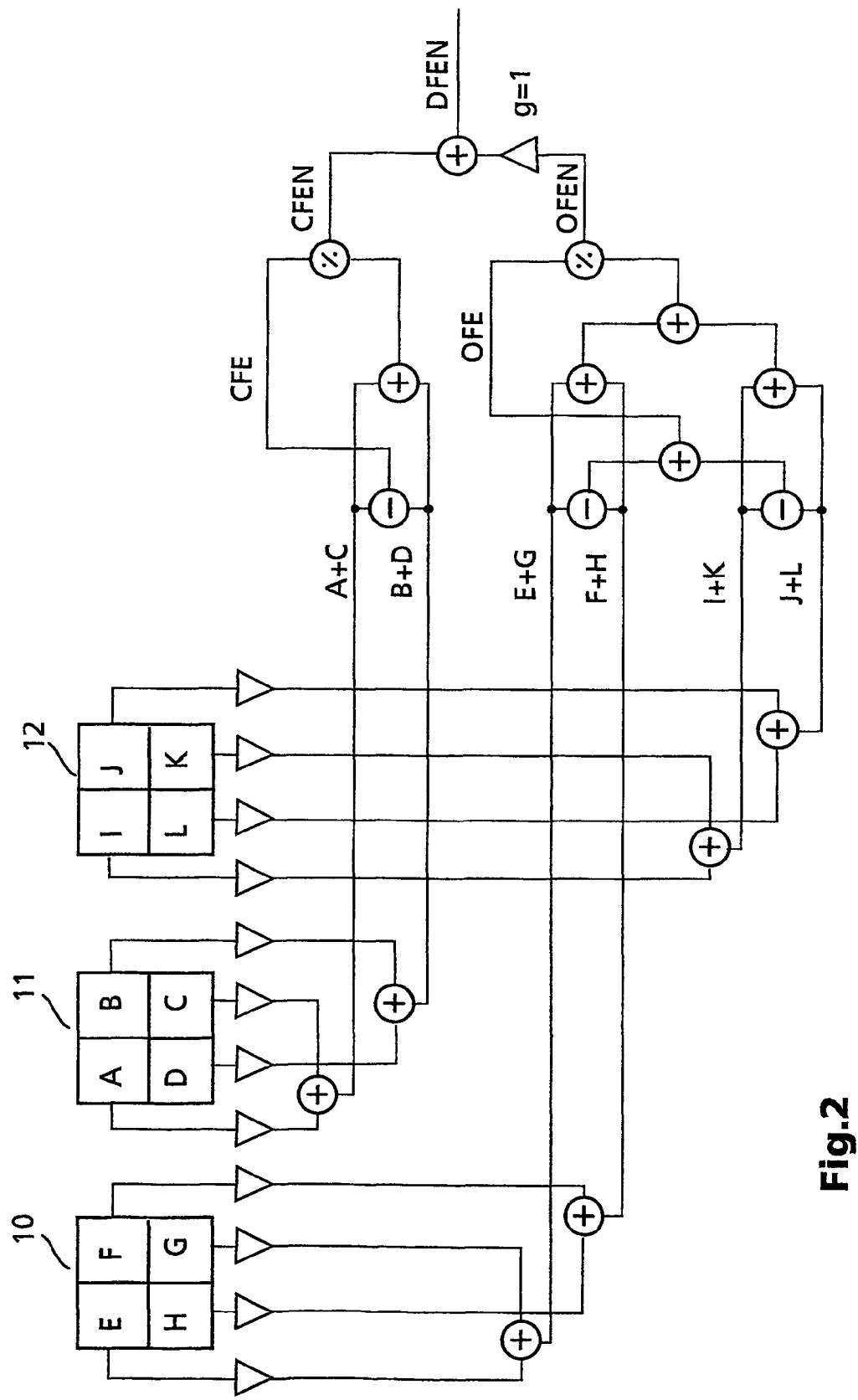
Figure 3:
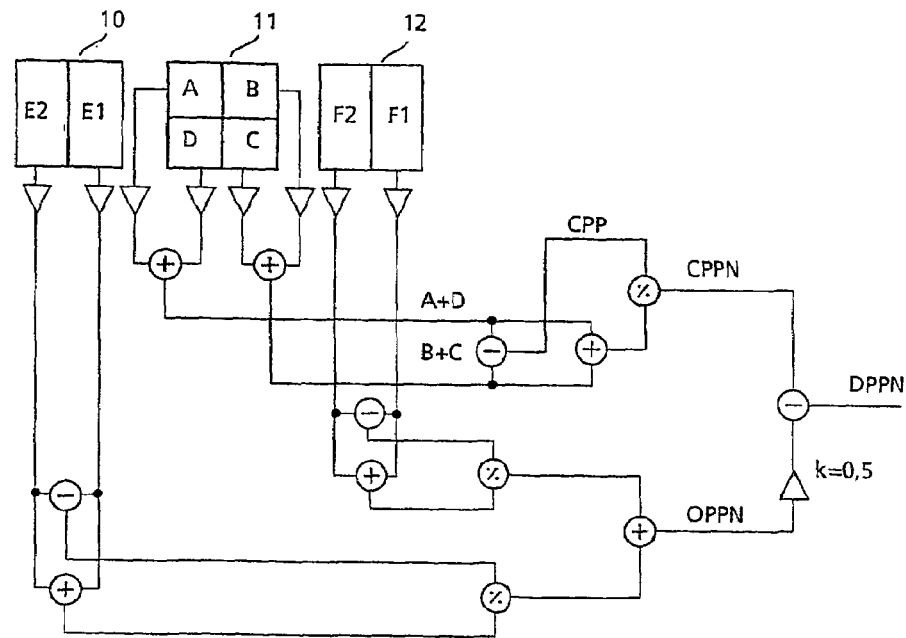
Figure 4:
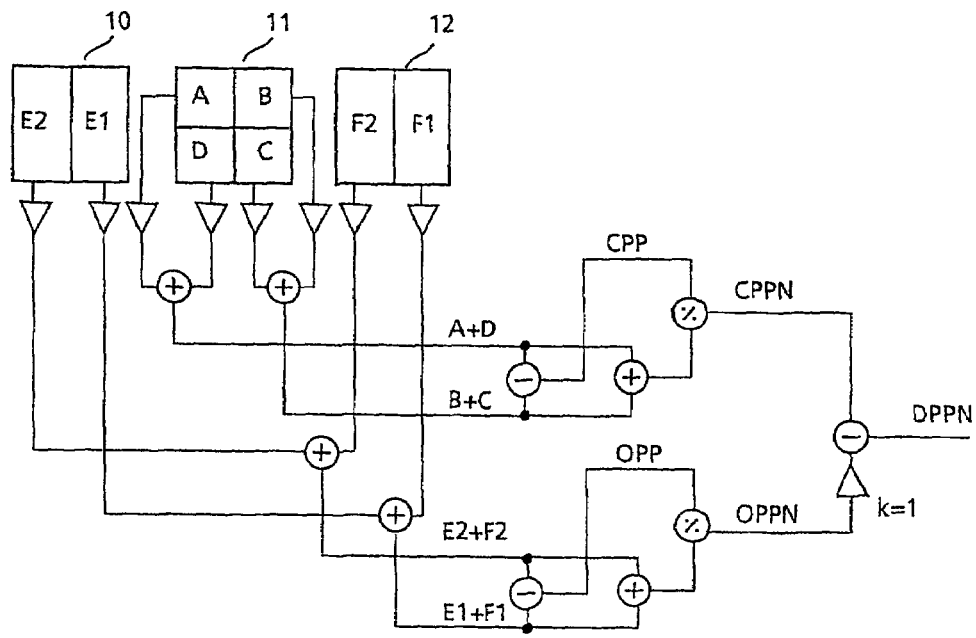
Figure 8:
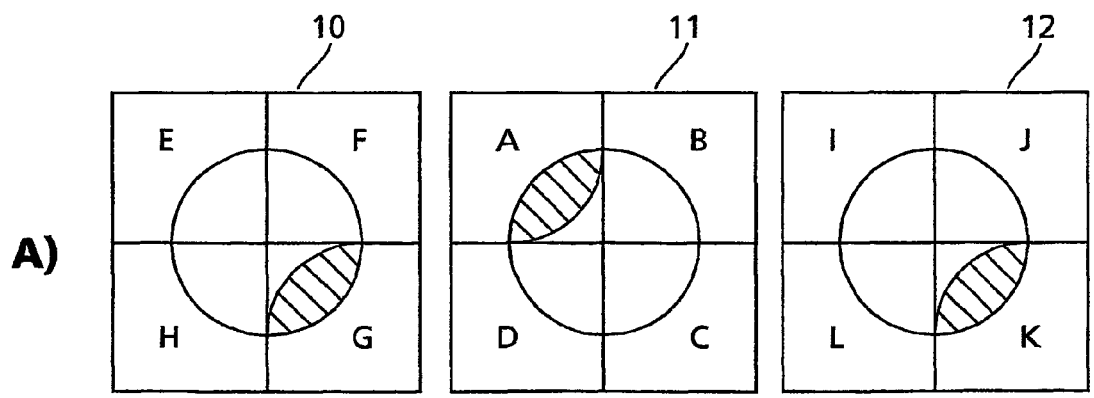
Figure 8:
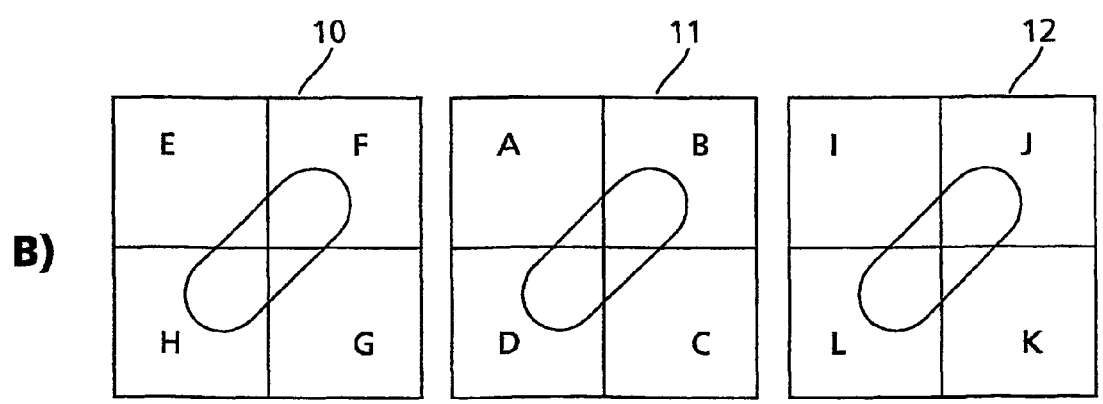
Figure 9:
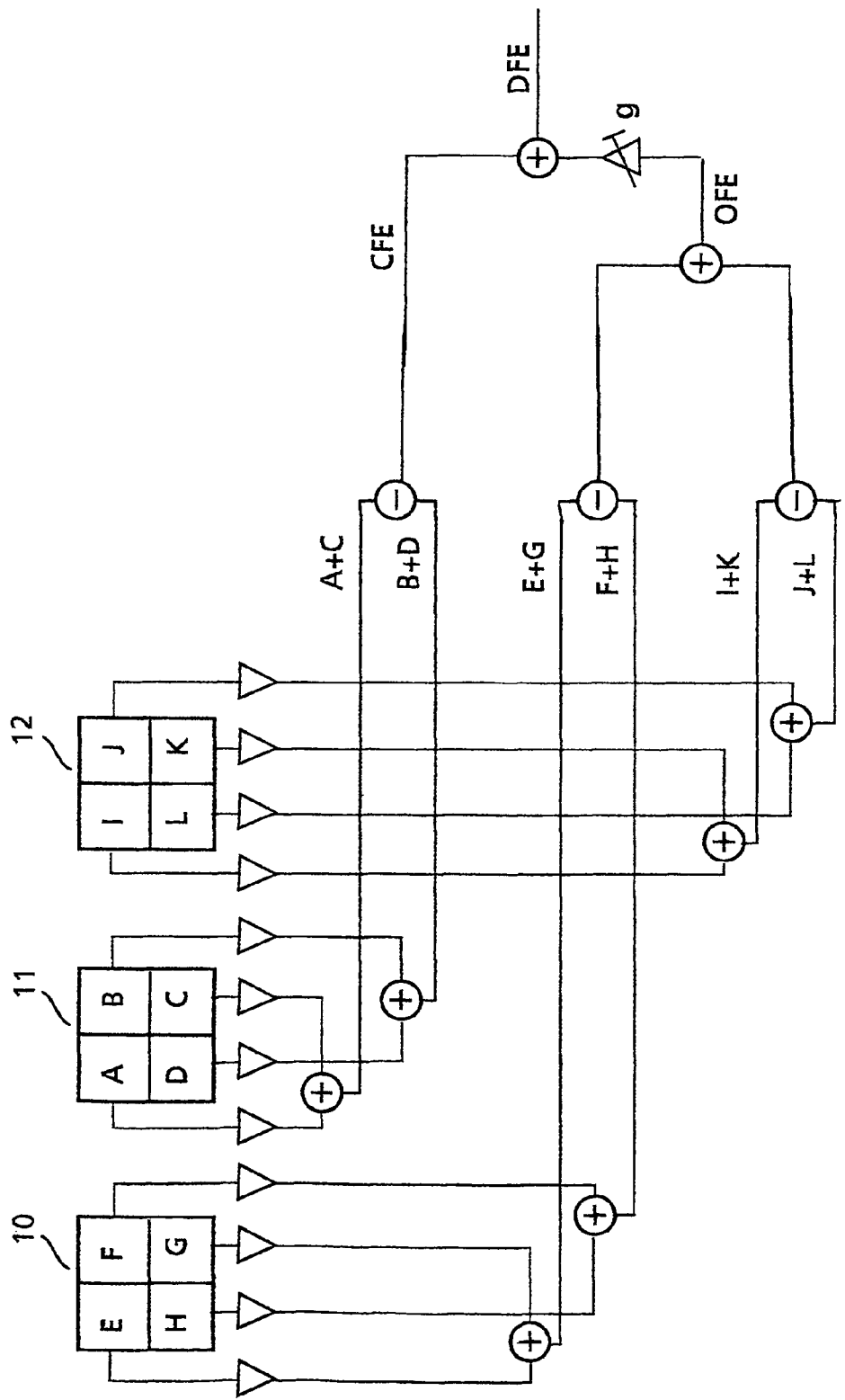
Figure 10:
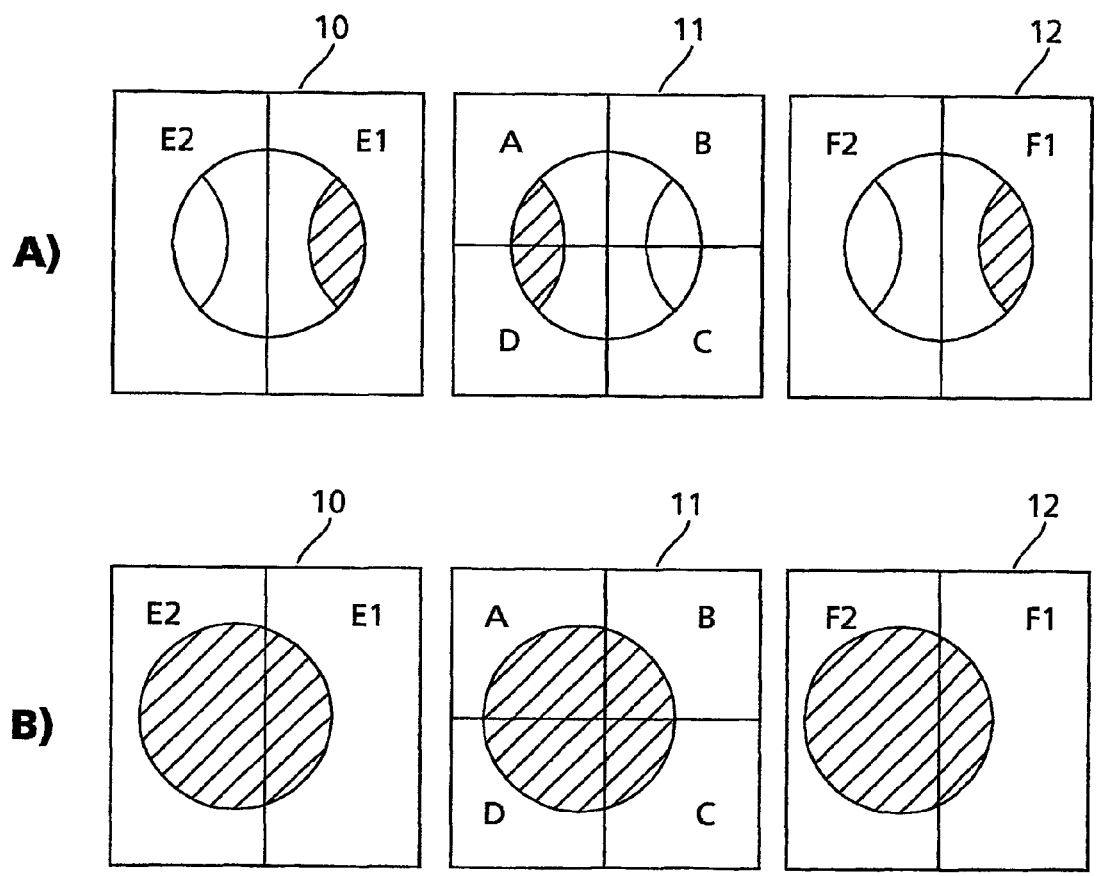
Figure 11:
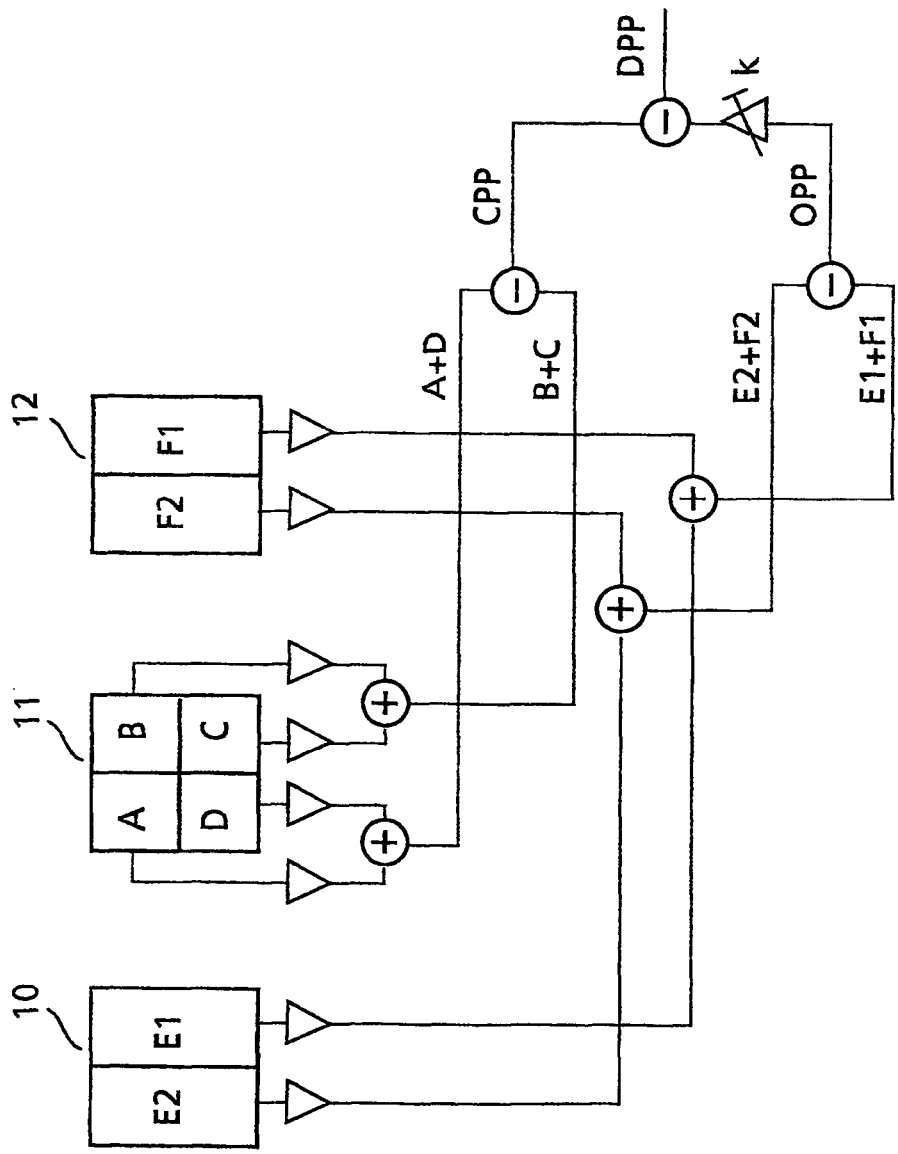
Figure 12:
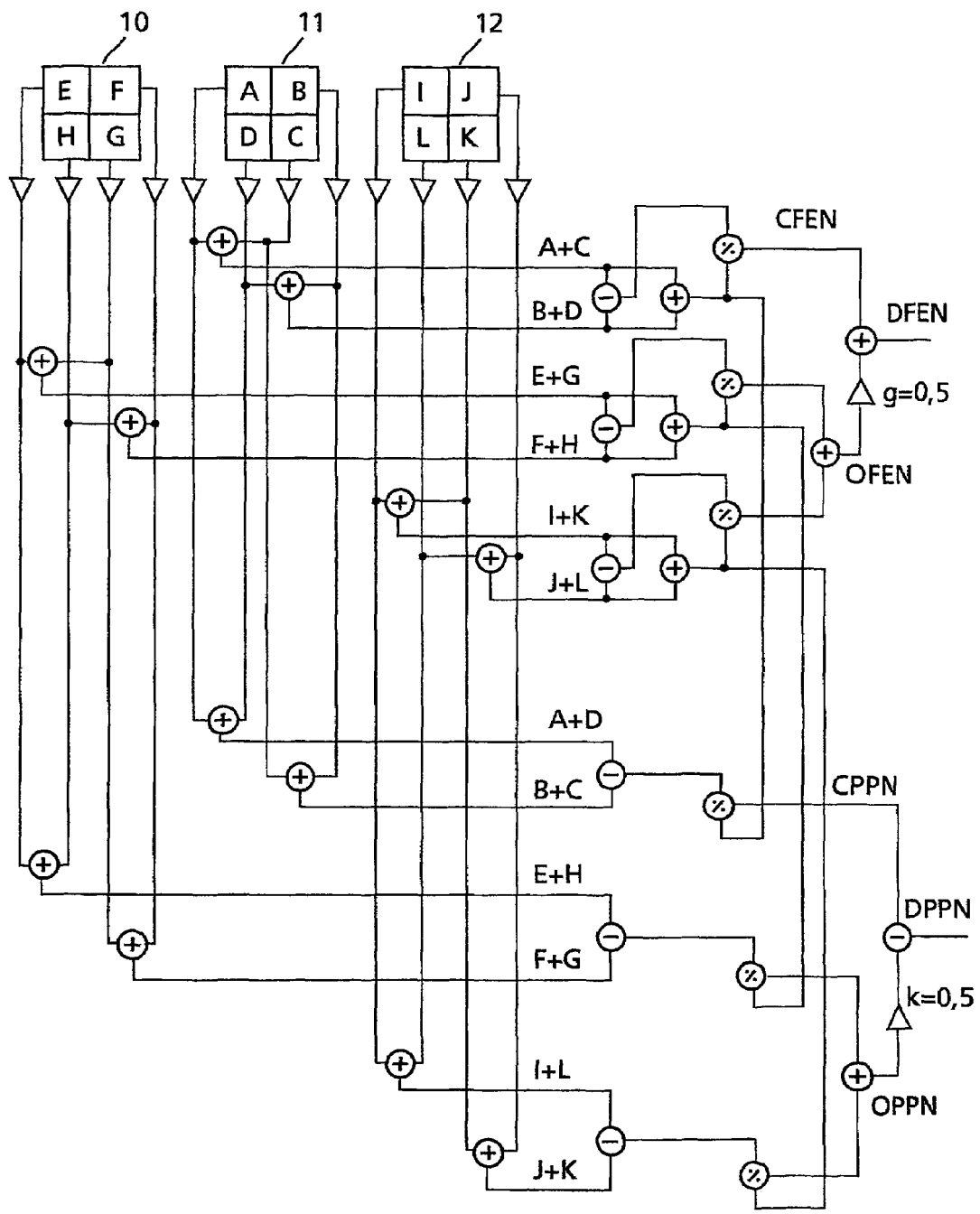
Figure 13:
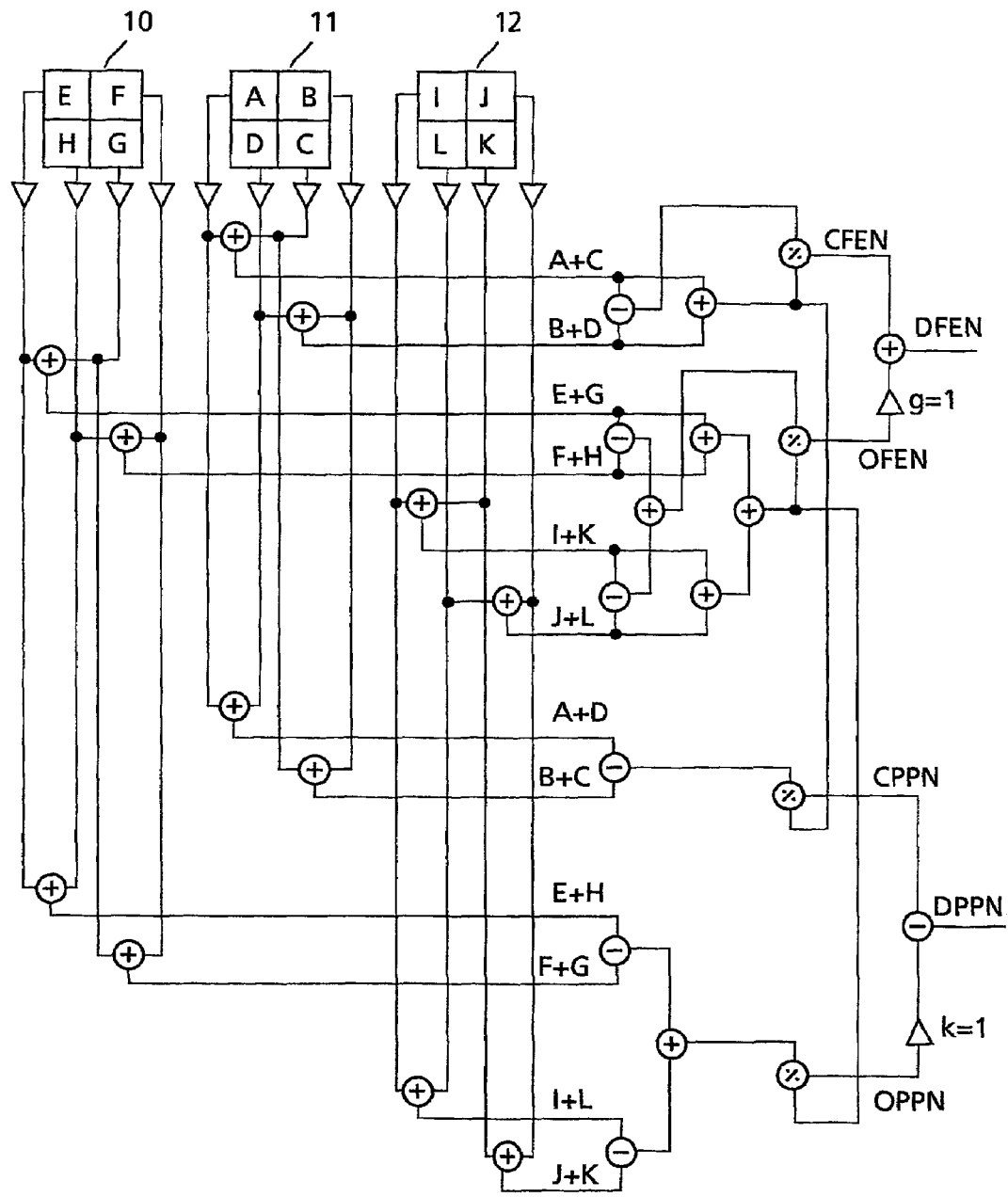

FIG. 1 shows a first exemplary embodiment of the invention for generating an offset-compensated focus error signal, FIG. 2 shows a second exemplary embodiment of the invention for generating an offset-compensated focus error signal, FIG. 3 shows a third exemplary embodiment of the invention for generating an offset-compensated focus error signal, FIG. 4 shows a fourth exemplary embodiment of the invention for generating an offset-compensated focus error signal, FIG. 5 shows a simplified construction of an optical scanner for carrying out the DFE method or DPP method according to the prior art, with this construction also being able to be applied to the present invention, FIG. 6 and FIG. 7 show illustrations for illustrating the scanning of adjacent tracks of an optical recording medium by a primary beam and two secondary beams, FIG. 8A shows a photodetector image upon application of the DFE method with the occurrence of a track-positioned-dependent focus offset component, but without the occurrence of an actual focus error, FIG. 8B shows a photodetector image upon application of the DFE method with the occurrence of a focus error, but without the occurrence of a track-position-dependent focus offset component, FIG. 9 shows a circuit arrangement according to the prior art for generating an offset-compensated focus error signal, FIG. 10A shows a photodetector image upon application of the DPP method with the occurrence of an actual track error, but without the occurrence of a lens-movement-dependent track offset component, FIG. 10B shows the illustration of a photodetector image upon application of the DPP method with the occurrence of a lens-movement-dependent track offset component, but without the occurrence of an actual track error, FIG. 11 shows a circuit arrangement according to the prior art for generating an offset-compensated track error signal, FIG. 12 shows a fifth exemplary embodiment of the invention for generating an offset-compensated focus and track error signal, and FIG. 13 shows a sixth exemplary embodiment of the invention for generating an offset-compensated focus and track error signal.

Figure 14:
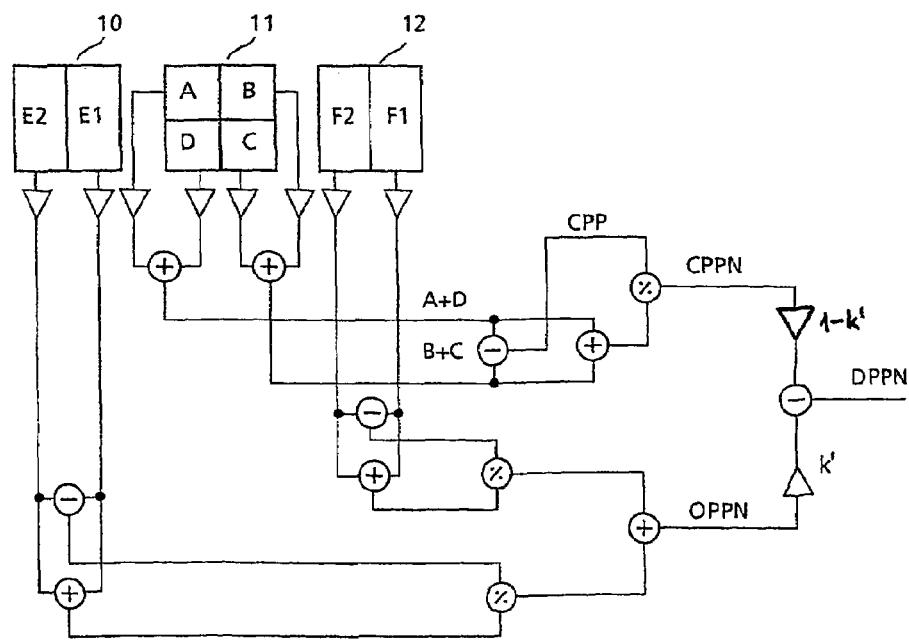

FIG. 14 shows a variant of the embodiment in FIG. 3, using two weighting factors K' and 1-k' acting on the primary and secondary beam signals, respectively.

Figure 15:
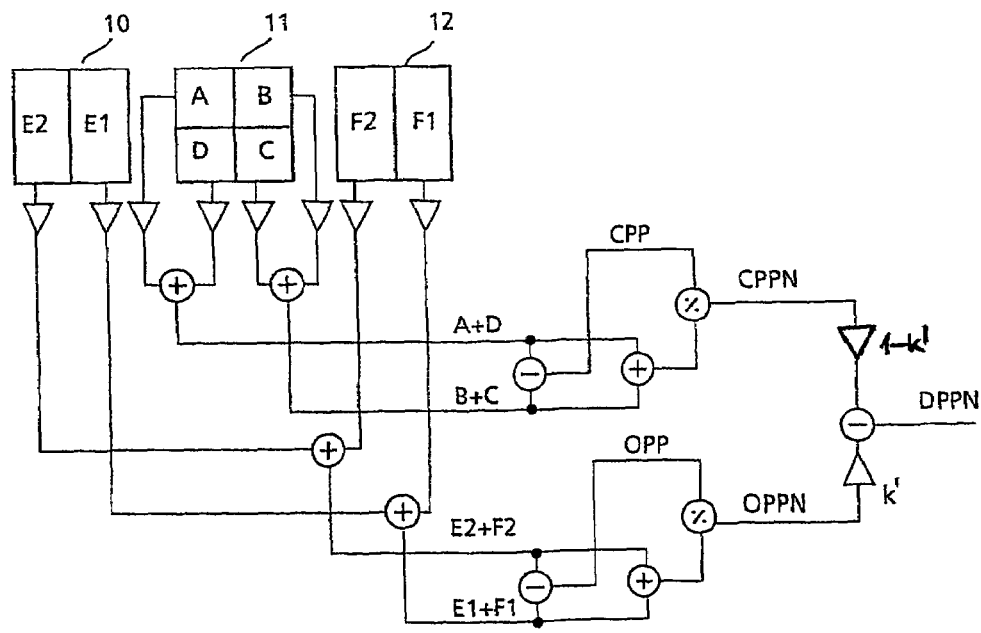

FIG. 15. shows a variant of the embodiment in FIG. 4. using two weighting factors K' and 1-k' acting on the primary and secondary beam signals, respectively.

As has already been mentioned previously, the focus error signal generated in accordance with the DFE method is composed, in practice, of the actual focus error and a track-position-dependent focus offset component. In order to generate an offset-compensated focus error signal DFE, the focus error signal CFE ("centre focus") generated in a manner dependent on the reflected primary beam is combined with the focus error signal OFE ("outer focus") generated in a manner dependent on the reflected secondary beams, in a weighted manner as follows:

$$DFE=CFE+g*OFE \quad (1)$$

In this case, upon application of the photodetector structure having three four-quadrant detectors 10-12 which is shown in FIG. 8, the following relationships hold true for the CFE signal and the OFE signal:

$$CFE=H'*((A+C)-(B+D)) \quad (2)$$

$$OFE=L'*((E+G)-(F+H))+R'*((I+K)-(J+L)) \quad (3)$$

In this case, g denotes the weighting factor, H' denotes the reflection factor of the track scanned by the primary beam, and L' and R' denote the reflection factors of the secondary tracks which are scanned by secondary beams and run to the left and right alongside the primary track scanned by the primary beam. A-L denote the output signals of the photodetector elements of the individual photodetectors 10-12 which are illustrated in FIG. 8.

The positions of the secondary beams on the optical recording medium are chosen in such a way that the track-position-dependent focus offset components of the CFE signal and of the OFE signal are in antiphase. This is achieved, in theory, when the focus points of the secondary beams lie on the centre of the complementary track with respect to the track centre illuminated by the primary beam. If the weighting factor g is chosen correctly, then the track-position-dependent offset components of the primary beam and of the secondary beams cancel one another out after summation.

The actual deviations of the position of the objective lens with respect to the information layer of the optical recording medium will affect all three scanning beams equally. The resultant actual focus error signals of the CFE signal and of the OFE signal are therefore in phase and are added.

The weighting factor g can be defined only if the reflection factors H', L' and R' are identical or constant. However, as has been described previously, this is not always ensured. The invention therefore proposes normalizing the reflection factors in order to achieve independence of the weighting factor g for the different reflection properties of the scanned tracks. Since both the actual focus error signal and the track-position-dependent focus offset components are proportional to the reflection of the respectively scanned track, it is greatly advantageous to achieve independence from the instantaneous reflection of the respectively scanned track by means of normalization of the focus error components respectively generated by the three scanning beams.

The reflection factor H' of the primary beam is proportional to the total quantity of light which strikes the photodetector 11 having the photodetector elements A-D. Division by the summation signal of the individual photodetector elements makes it possible to achieve normalization for the primary beam:

$$CFEN=((A+C)-(B+D))/(A+B+C+D) \quad (4)$$

In this case, CFEN denotes the normalized CFE signal. The summation signal (A+B+C+D) is proportional to the reflection factor H' of the primary beam. The same also applies correspondingly to the reflection factors L' and R', i.e. the reflection factor L' is proportional to the summation signal (E+F+G+H) of the individual photodetector elements of the photodetector 10, while R' is proportional to the summation signal (I+J+K+L) of the individual photodetector elements of the photodetector 12. Consequently, it is possible to define a normalized OFE signal OFEN as follows:

$$OFEN=((E+G)-(F+H))/(E+F+G+H)+((I+K)-(J+L))/(I+J+K+L) \quad (5)$$

From this there results a first exemplary embodiment for a corresponding circuit arrangement in which normalization is provided separately for each focus error signal derived from the three primary and secondary beams, i.e. three dividers are required in order to normalize the respective components of the three beams, the following relationship following from the formulae (1) and (4), (5) for the normalized focus error signal DFEN:

$$DFEN=((A+C)-(B+D))/(A+B+C+D)+g*(((E+G)-(F+H))/(E+F+G+H)+((I+K)-(J-L))/(I+J+K+L)), \quad (6)$$

The normalization likewise compensates the differences in the intensities of the quantities of light reflected from the three tracks and also the total intensity of the scanning beam directed at the optical recording medium. The amplitudes of the focus error signals generated from the three beams will thus be of the same size after normalization. This applies both to the track-position-dependent focus offset components and to the actual focus error components. In order to make the track-position-dependent focus offset components equal to zero, the following relationship must therefore hold true:

$$DFEN_o = CFEN_o + g*OFEN_o = 0;\ OFEN_o = 2*CFEN_o \quad (7)$$

In this case, the index "o" designates the respective focus offset components of the normalized signals DFEN, CFEN and OFEN. Thus, with g=0.5, complete compensation of the track-position-dependent focus offset component is achieved. In this case, the total focus error component will be twice as large as that of the primary beam alone.

A corresponding circuit arrangement for generating this normalized offset-compensated focus error signal DFEN is illustrated in FIG. 1. As can be seen from FIG. 1, firstly a normalized CEFN signal and a normalized OFEN signal are generated in accordance with the above formulae (4) and (5), the OFEN signal being obtained from two intermediate signals OFE1 and OFE2. The offset-compensated focus error signal DFEN is obtained by additive combination of these two normalized error signals CFEN and OFEN with g=0.5.

A conventional circuit arrangement for generating the focus error signal DFE in accordance with the above formulae (1)-(3) is illustrated for comparison in FIG. 9.

Since, in the previously described optical arrangement, the secondary beams are symmetrical with respect to the primary beam and illuminate the complementary tracks with respect to the tracks detected by the primary beam, their respective components for forming the actual focus error signal and the track-position-dependent focus offset is identical in terms of magnitude. Therefore, the following also holds true:

$$OFE = (((E+G)-(F+H))+((I+K)-(J+L)))*(L'+R') \quad (8)$$

The sum (L'+R') is once again proportional to the total quantity of light falling onto the two detectors 10 and 12. Therefore, the normalization is also valid for both secondary beam components together, so that the following holds true:

$$OFEN = (((E+G)-(F+H))+((I+K)-(J+L)))/(E+F+G+H+I+J+K+L) \quad (9)$$

It is apparent from this, for a second exemplary embodiment of the present invention, whose circuit arrangement is illustrated in FIG. 2, that only two dividers have to be used in order to normalize the respective components of the three beams in accordance with the following relationship:

$$DFEN = ((A+C)-(B+D))/(A+B+C+D) + g*(((E+G)-(F+H))+((I+K)-(J+L)))/(E+F+G+H+I+J+K+L) \quad (10)$$

As a result of the normalization, the intensities of the light directed at the three tracks are likewise concomitantly normalized, but by joint normalization in the case of the secondary beams. The amplitudes of the error signals generated from the two contributions will thus be of the same size after normalization. This applies both to the track-position-dependent focus offset components and to the focus error components. In order to make the focus offset components equal to zero, the following must therefore hold true for g:

$$DFEN_o = CFEN_o + g*OFEN_o = 0;\ OFEN_o = DFEN_o \quad (11)$$

Consequently, with g=1, complete compensation of the track-position-dependent focus offset component is achieved. In this case, the total focus error component will be twice as large as that of the primary beam.

The above description makes it clear that, with the aid of the present invention, the individual contributions which enter into the offset-compensated focus error signal can be made independent of the reflection properties of the respectively scanned tracks of the optical recording medium.

Likewise, independence from the instantaneous reflection of the respectively scanned track can be achieved during the generation of an offset-compensated track error signal in accordance with the DPP method by means of normalization of the track error components respectively read.

The conventional approach for generating the offset-compensated DPP signal according to the prior art is as follows:

$$DPP = CPP - k*OPP \quad (12)$$

In this case, the CPP signal designates the track error signal generated in a manner dependent on the reflected primary beam, while the OPP signal represents the track error signal obtained in a manner dependent on the reflected secondary beams. k denotes the weighting factor for the weighted combination of the CPP signal and of the OPP signal.

The CPP signal and the OPP signal can be expressed as a function of the reflection factors of the respectively scanned track of the optical recording medium, assuming the photodetector structure shown in FIG. 10, as follows:

$$CPP = H'*((A+D)-(B+C)) \quad (13)$$

$$OPP = L'*(E2-E1) + R'*(F2-F1) \quad (14)$$

In this case, H' denotes the reflection factor of the track scanned by the primary beam, while L' and R' denote the reflection factors of the tracks scanned by the secondary beams to the left and right of the primary track scanned by the primary beam. As is shown in FIG. 10, a four-quadrant photodetector having photodetector elements A-D is used for detecting the primary beam, while respective photodetectors 10 and 12 having only two photodetector elements E1 and E2, and respectively F1 and F2, are used for detecting the reflected secondary beams.

The positions of the secondary beams on the optical recording medium are chosen in such a way that the trace-error-proportional components of the CPP signal and of the OPP signal are in antiphase. Those components of the CPP signal and of the OPP signal which are caused by the movement of the objective lens from the optical axis, i.e. the lens-movement-proportional components, are in phase, however. If the factor k is chosen correctly, then these lens-movement-proportional components of the CPP signal and of the OPP signal are mutually cancelled out during subtraction. Therefore, the factor k is to be chosen in such a way that the following holds true:

$$DPP_1 = CPP_1 - k*OPP_1 = 0 \quad (15)$$

The index "1" denotes the lens-movement-proportional or lens-movement-dependent component of the individual signals.

The value for the weighting factor k can be defined only if the reflection factors H', L' and R' are identical or constant. As has already been described, however, this is not always ensured. According to the invention, however, independence of the weighting factor k from the different reflection properties of the respectively scanned tracks of the optical recording medium is achieved by means of normalization.

As has already been described, the reflection factor H' of the primary beam is proportional to the total quantity of light which strikes the photodetector 11 having the photodetector elements A-D. Consequently, analogously to the previously described case of normalization of the DFE signal, by division by the summation signal of the individual photodetector elements A-D, normalization for the primary beam can be achieved as follows:

$$CPPN=((A+D)-(B+C))/(A+B+C+D) \quad (16)$$

In this case, CPPN denotes the normalized CPP signal. A normalized OPP signal OPPN can likewise be defined for the reflection factors L' and R':

$$OPPN=(E2-E1)/(E1+E2)+(F2-F1)/(F1+F2) \quad (17)$$

Consequently, from the formulae (12), (16) and (17), there follows for the generation of a normalized DPP signal DPPN:

$$DPPN=((A+D)-(B+C))/(A+B+C+D)-k^*((E2-E1)/(E1+E2)+(F2-F1)/(F1+F2)) \quad (18)$$

The normalization likewise concomitantly normalizes the differences in the intensities of the light directed at the three tracks. The amplitudes of the error signals generated from the three beams will thus be of the same size after normalization. From the formula (15), it follows for the lens-movement-dependent component where $$OPP_1=2^*CPP_1, \quad (19)$$

that, for k=0.5, complete compensation of the lens-movement-dependent component can be achieved. In this case, the track-error-dependent component will be twice as large as that of the primary beam alone.

FIG. 3 illustrates an exemplary embodiment—corresponding to the formula (18)—for a circuit arrangement according to the invention for generating the offset-compensated normalized track error signal DPPN, three dividers being used separately in order to normalize the individual beams.

A conventional circuit arrangement according to the prior art for generating the track error signal DPP in accordance with the above formulae (12)-(14) is illustrated for comparison in FIG. 11. As can be seen from FIG. 11, the CPP and OPP signals are not normalized in accordance with the prior art. Therefore, it is necessary for the weighting factor k to be continuously adapted to the reflection properties of the respectively scanned tracks.

Since, in the case of the previously mentioned optical arrangement, the secondary beams are arranged symmetrically with respect to the primary beam, their respective components for forming the track error signal has the same magnitude. The following therefore holds true:

$$OPP=((E2+F2)-(E1+F1))^*(L'+R') \quad (20)$$

The sum (L'+R') is once again proportional to the total quantity of light falling onto the detector elements E1, E2, F1 and F2. Therefore, the following normalization valid for both secondary beam components can be carried out:

$$OPPN=((E2+F2)-(E1+F1))/(E1+E2+F1+F2) \quad (21)$$

The following emerges from this for the normalized error signal DPPN:

$$DPPN=((A+D)-(B+C))/(A+B+C+D)-k^*(((E2+F2)-(E1+F1))/(E1+E2+F1+F2)) \quad (22)$$

The normalization likewise concomitantly normalizes the differences in the intensities of the light directed at the three tracks. The amplitudes of the error signals generated from the three beams will thus be of the same size after normalization. For complete compensation of the lens-movement-dependent component, the following relationship holds true:

$$DPP_1=CPP_1-k^*OPP_1=0; OPP_1=CPP_1 \quad (23)$$

Consequently, with k=1, complete compensation of the lens-movement-dependent component of the track error signal DPPN can be achieved. In this case, the track-error-dependent component is twice as large as that of the primary beam alone.

A corresponding circuit arrangement for generating the corrected or compensated track error signal DPPN in accordance with the above formula (22) is illustrated in FIG. 4. As can be seen from FIG. 4, only two dividers are required for generating the normalized signal CPPN or the normalized signal OPPN, which are subsequently combined by weighted subtraction with k=1 to form the compensated track error signal DPPN.

It goes without saying that the above DPP method can also be employed if the photodetectors in each case have four light-sensitive areas. In this case, corresponding summation signals are still formed by two respective detector areas.

Furthermore, it should be noted that the previously described weighting factors g and k are valid only when component tolerances and other tolerances do not have to be taken into account. By way of example, an error source might be the normalization elements used in FIGS. 1-4, since divisions are difficult to realize using analogue technology. Consequently, the previously described weighting factors apply only to the ideal case. In order to compensate component tolerances, if appropriate a departure is made from these values to a greater or lesser extent.

Likewise, it is possible, in contrast to the exemplary embodiments illustrated in FIGS. 1-4, to apply the weighting factors g and k to the primary beam signals CFEN and CPPN, respectively, as well, so that the normalized focus error signal DFEN is calculated in accordance with the following formula:

$$DFEN=g'^*CFEN+OFEN \text{ where } g'=1/g \quad (24)$$

The normalized track error signal DPPN is then analogously calculated in accordance with the following formula:

$$DPPN=k'^*CPPN-OPPN \text{ where } k'=1/k \quad (25)$$

In the case of the previously described exemplary embodiments illustrated in FIGS. 1-4, the normalization was in each case employed separately in order to form a focus or track error signal. However, the circuitry outlay can be reduced if the normalization is employed for forming both the focus and the track error signal, since then the summation for obtaining the respective normalization signal can be used jointly for both signal paths. FIG. 12 and FIG. 13 illustrate corresponding exemplary embodiments, FIG. 12 showing an exemplary embodiment corresponding to FIGS. 1 and 3 in which the secondary scanning beams are normalized separately in each case (weighting factors g, k=0.5), while FIG. 13 shows an exemplary embodiment corresponding to FIGS. 2 and 4 with joint normalization of the secondary scanning beams (weighting factors g, k=1).

The illustrations of FIG. 12 and FIG. 13 also reveal how the DPP method can be applied to three photodetectors 10-12 each having four light-sensitive areas. In this case, the two photodetector elements E1, E2 and F1, F2 of the embodiments described above correspond to the photodetector elements F and G, E and H and, respectively J and K, I and L.

Consequently, according to the invention, a corrected or compensated focus error signal DFEN or track error signal DPPN is obtained by primary and secondary scanning beams incident on adjacent tracks of an optical recording medium 7 being generated and the primary and secondary scanning beams reflected from the optical recording medium being detected in order to derive therefrom primary-beam and secondary-beam focus error signals CFE, OFE or primary-beam and secondary-beam track error signals CPP, OPP, which are subsequently normalized in order to obtain the compensated focus error signal DFEN error track or signal DPPN from the normalized primary-beam and secondary-beam error signals CFEN, OFEN; CPPN, OPPN by means of weighted combination. As a result of the normalization, the corrected or compensated circuit error signal DFEN or track error signal DPPN can be generated independently of the reflection properties of the respectively scanned track.

An apparatus according to the invention is suitable for reading from and/or writing to optical recording media which have, in terms of their physical properties, different track types arranged adjacent to one another. The apparatus has a beam generation unit for generating primary and secondary scanning beams incident on adjacent tracks of a recording medium, a photodetector having multi-zone detector elements for detecting the primary and secondary scanning beams reflected from the recording medium, and an evaluation circuit for forming a corrected error signal by weighted combination of primary-beam and secondary-beam error signals formed from the detected signals of the primary and secondary scanning beams. In this case, the evaluation circuit has normalizing means for normalizing primary-beam and secondary-beam error signals.

As already mentioned, for all the above considerations it was assumed in a simplification that the intensities of the three scanning beams considered are identical when impinging on the photodetector unit 9. Therefore, the compensation factors g and k specified apply only if this simplification is employed.

In practice, however, the intensity of the secondary beams is dependent on their track position, on the reflection of the scanned track and also on the properties of the optical diffraction grating 3 and is weaker than the intensity of the primary beam, so that the intensity of the secondary beams must be scaled correspondingly with respect to the primary beam intensity. Ideally, this is done by normalization. To that end, the signals derived from the reflected beams are normalized. The signals CPP and OPP or, alternatively, the individual signals OPP1 and OPP2 are normalized by these signals being divided by the summation signals which are proportional to the quantity of light respectively taken up by the detector areas.

As described above, it is necessary to adapt the weighting factor g or k to the secondary track spacings. By way of example, if the variant shown in FIG. 3 is taken as a basis, then the signal amplitudes of the signal DPPN is dependent on the setting of the compensation factor k.

The variant of the embodiments in accordance with FIGS. 3 and 4 which is shown in FIGS. 14 and 15, respectively, relates to the weighting between primary beam and secondary beams. By way of example, the weighting factor k for the secondary beam signal is advantageously replaced by two weighting factors k' and 1−k' which act on the primary and secondary beam signals, where k' can be calculated from k according to the following relationship:

$$k' = \frac{k}{(1+k)}$$

The effects achieved by splitting the weighting factor k into two weighting factors dependent on k' is that the amplitude of the normalized signal DPPN is independent of the weighting factor to be set in each case. Correspondingly, this formula can also be applied to the weighting factor g for forming the signal DFEN. The factors g and k are chosen for example in the manner described with respect to FIG. 3 and FIG. 4.

The invention claimed is:

1. Method for generating a corrected focus error signal DFEN for the operation of an apparatus for reading from and/or writing to an optical recording medium, comprising:
   a primary scanning beam illuminating a track of the recording medium and a secondary scanning beam having a focus point on an adjacent complementary track being generated and the primary and secondary scanning beams reflected from the recording medium being detected by respective photodetectors, and
   a primary-beam focus error signal and a secondary-beam focus error signal being derived from the detected reflected primary and secondary scanning beams and being combined with one another in a weighted manner in order to form a corrected focus error signal DFEN,
   wherein a normalized primary-beam focus error signal CFEN and a normalized secondary-beam focus error signal OFEN are generated separately by dividing the primary-beam focus error signal and the secondary-beam focus error signal by the total quantity of light detected by the respective photodetectors, before the corrected focus error signal DFEN is formed by weighted combination therefrom.

2. Method according to claim 1, wherein the corrected focus error signal DFEN is obtained from the normalized primary-beam focus error signal CFEN and the normalized secondary-beam focus error signal OFEN in accordance with the following relationship:

$$DFEN=CFEN+g* OFEN,$$

where g denotes a weighing factor.

3. Method according to claim 1, wherein
   a primary scanning beam and two secondary scanning beams are generated and the primary and secondary scanning beams reflected from the optical recording medium are detected by photodetectors each having four photodetector elements, and
   the corrected focus error signal DFEN is obtained in accordance with the following relationship:

$$DFEN=((A+C)-(B+D))/(A+B+C+D)+g*(((E+G)-(F+H))/(E+F+G+H)+((I+K)-(J-L))/(I+J+K+L)),$$

where A, B, C, D denote the output signals of the photodetector elements of the photodetector which detects the reflected primary scanning beam, while E, F, G, H and I, J, K, L denote the output signals of the photodetector elements of the photodetectors which detect the reflected secondary scanning beams.

4. Method according to claim 3, wherein g=0.5 is chosen for the weighting factor.

5. Method for generating a corrected focus error signal DFEN for the operation of an apparatus for reading from and/or writing to an optical recording medium, comprising:
   a primary scanning beam and two secondary scanning beams incident on adjacent tracks of the recording medium being generated and the primary and secondary scanning beams reflected from the optical recording medium being detected by photodetectors each having four photodetector elements,
   primary-beam and secondary-beam focus error signals being derived from the detected reflected primary and secondary scanning beams and being combined with one another in a weighted manner in order to form the corrected focus error signal DFEN, the corrected focus error signal DFEN is obtained in accordance with the following relationship:

$$DFEN=((A+C)-(B+D))/(A+B+C+D)+g*(((E+G)-(F+H))+((I+K)-(J+L)))/(E+F+G+H+I+J+K+L),$$

where A, B, C, D denote the output signals of the photodetector elements of the photodetector which detects the reflected primary scanning beam, while E, F, G, H and I, J, K, L denote the output signals of the photodetector elements of the photodetectors which detect the reflected secondary scanning beams.

6. Method according to claim 5, wherein g=1 is chosen for the weighting factor.

7. Method for generating a corrected error signal for the operation of an apparatus for reading from and/or writing to an optical recording medium, comprising:
a primary scanning beam and two secondary scanning beams incident on adjacent tracks of the recording medium being generated, the secondary scanning beams reflected from the optical recording medium each being detected by photodetectors having two photodetector elements, the primary scanning beam reflected from the optical recording medium being detected by a photodetector having four photodetector elements,
wherein a corrected track error signal DPPN is obtained in accordance with the following relationship:

$$DPPN=((A+D)-(B+C))/(A+B+C+D)-k*((E2-E1)/(E1+E2)+(F2-F1)/(F1+F2)),$$

where A, B, C, D denote the output signals of the photodetector elements of the photodetector provided for detection of the reflected primary scanning beam, while E1 and E2, and respectively F1 and F2, denote the output signals of the photodetector elements of the photodetectors provided for detection of the reflected secondary scanning beams.

8. Method according to claim 7, wherein K=0.5 is chosen for the weighting factor.

9. Method for generating a corrected error signal for the operation of an apparatus for reading from and/or writing to an optical recording medium, comprising:
a primary scanning beam and two secondary scanning beams being generated, the secondary scanning beams reflected from the optical recording medium each being detected by photodetectors having two photodetector elements, the primary scanning beam reflected from the optical recording medium being detected by a photodetector having four photodetector elements, wherein
a corrected track error signal DPPN is obtained in accordance with the following relationship:

$$DPPN=((A+D)-(B+C))/(A+B+C+D)-k*(((E2+F2)-(E1+F1))/(E1+E2+F1+F2)),$$

where A, B, C, D denote the output signals of the photodetector elements of the photodetector provided for detection of the reflected primary scanning beam, while E1 and E2, and respectively F1 and F2, denote the output signals of the photodetector elements of the photodetectors provided for detection of the reflected secondary scanning beams.

10. Method according to claim 9, wherein k=1 is chosen for the weighting factor.

11. Apparatus for reading from and/or writing to an optical recording medium, comprising:
a beam generation unit for generating primary and more than one secondary scanning beams incident on adjacent tracks of the optical recording medium,
a photodetector unit for detecting the primary and secondary scanning beams reflected from the optical recording medium, and
an evaluation unit for forming a corrected error signal by weighted combination of primary-beam and more than one secondary-beam error signals derived from the detected reflected primary and secondary scanning beams, the evaluation unit having normalization means for normalizing the primary-beam and secondary-beam error signals before the weighted combination thereof to form the corrected error signal,
wherein the normalization means are configured in such a way that the more than one secondary-beam error signals are added before being jointly normalized by dividing a result of the addition by a sum of all signals derived from the more than one secondary scanning beams.

12. Apparatus according to claim 11, wherein
the evaluation unit is configured for generating primary-beam and secondary-beam track error signals and for generating a corrected track error signal by weighted combination of the normalized primary-beam and secondary-beam track error signals.

13. Apparatus for reading from and/or writing to an optical recording medium, comprising:
a beam generation unit for generating a primary scanning beam illuminating a track of the optical recording medium and a secondary scanning beam having a focus point on an adjacent complementary track,
a photodetector unit for detecting the primary and secondary scanning beams reflected from the optical recording medium by respective photodetectors, and
an evaluation unit for forming a corrected focus error signal DFEN by weighted combination of a primary-beam focus error signal and a secondary-beam focus error signal derived from the detected reflected primary and secondary scanning beams,
wherein the evaluation unit has normalization means for separately generating a normalized primary-beam focus error signal CFEN and a normalized secondary-beam focus error signal OFEN by dividing the primary-beam focus error signal and the secondary-beam focus error signal by the total quantity of light detected by the respective photodetectors, before the weighted combination thereof to form the corrected focus error signal DFEN.

14. Apparatus according to claim 13, wherein
the evaluation unit or the normalization means are configured for obtaining the corrected focus error signal DFEN from the normalized primary-beam focus error signal CFEN and the normalized secondary-beam focus error signal OFEN in accordance with the following relationship:

$$DFEN=CFEN+g*OFEN,$$

where g denotes a weighting factor.

* * * * *